United States Patent [19]
Nakajima

[11] 3,766,670
[45] Oct. 23, 1973

[54] SPIKE FOR SHOES AND A METHOD FOR MANUFACTURING THEREOF

[75] Inventor: Yoshinori Nakajima, Itami, Japan

[73] Assignee: Sumitamo Electric Industries, Ltd., Osaka, Japan

[22] Filed: July 26, 1972

[21] Appl. No.: 275,404

[30] Foreign Application Priority Data
July 26, 1971 Japan.................................. 46/65568

[52] U.S. Cl............................... 36/67 B, 12/146 R
[51] Int. Cl............................................. A43c 15/00
[58] Field of Search.............. 36/2.5 R, 67 R, 67 D, 36/59 R; 12/146 R, 142 P, 67 B

[56] References Cited
UNITED STATES PATENTS

| | | | |
|---|---|---|---|
| 3,552,043 | 1/1971 | Moffa | 36/67 D |
| 2,652,638 | 9/1953 | Shoemaker | 36/67 B |
| 3,537,193 | 11/1970 | Bernier et al. | 36/67 A |

*Primary Examiner*—Patrick D. Lawson
*Attorney*—Richard C. Sughrue et al.

[57] ABSTRACT

A spike for shoes comprising a steel shank having a flange and super hard tip, the latter being jointed to the former fixedly through a concave-convex engagement by means of electro-resistant welding.

6 Claims, 4 Drawing Figures

Patented Oct. 23, 1973  3,766,670

SPIKE FOR SHOES AND A METHOD FOR MANUFACTURING THEREOF

BACKGROUND OF THE INVENTION

1. Field of the Invention

This invention relates to a spike for attachment to the sole of shoes, such as for golf, shore fishing, athletics, ball games or the like and to a method for manufacturing thereof.

2. Description of the Prior Art

A conventional spike for shoes, as is shown in FIG. 1, comprising a steel shank 2 having a flange 1 and a cemented tungsten carbide tip 4 is manufactured by soldering together the ends of the members through a solder 6. This method, however, requires the solder and flux for melting the solder, generally troublesome in mass production. Further, it is difficult to fix the relative positions of the shank 2 and the tip 4 if the connecting ends to be joined are flat, since the spike is very small. Also, the members are easily detached during their usage, since the spike often suffers from hard shocks. Furthermore, heat-treating of the steel shank cannot be performed, since the solder fuses during heat-treatment if the spike is heat-treated after soldering. On the other hand, if steel shank is pre-treated and hardened before soldering, its hardness reduces in the following heating process for brazing. Therefore, the steel shank is rather soft in the neighborhood of the connecting part and is heat worn there during its usage, so that the cemented carbide tip drops.

SUMMARY OF THE INVENTION

The object of the present invention is to provide such a spike for shoes that can solve the above-mentioned defects and to provide an easy method for manufacturing thereof, so that the tip is tightly secured to the shank.

To achieve the object, the present invention is characterized in that a concave-convex engagement is formed at the end of the super hard tip and the steel shank and that both members are joined by electro-resistant welding without conventional solder.

DESCRIPTION OF PREFERRED EMBODIMENTS

Figure 2:
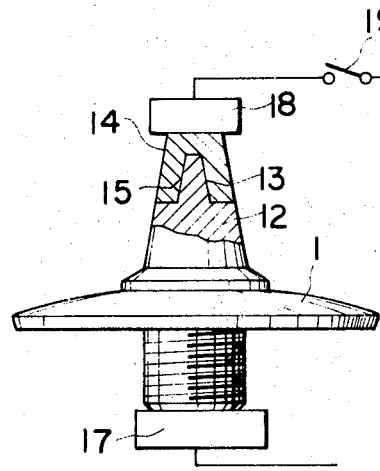
FIG. 2 is a side view, partly in section, showing a process for manufacturing the spike according to the present invention.

FIG. 2 shows an embodiment of the present invention. A steel shank 12 having a flange 1 is provided with a projection 13 at the center of an end thereof, while cemented carbide tip 14 is provided with a recess 15. After the projection 13 is fitted in the recess 15, contact surfaces of the steel shank 12 and the super hard tip 14 are welded to one piece by electro-resistant welding.

To perform the electro-resistant welding, a pair of electrodes 17 and 18 are mechanically pressed to the carbide tip 14 and the steel shank 12, respectively, and a switch 19 from a source (not shown) is closed, so that the contact surfaces between the shank 2 and the tip 4 are locally fused or welded by joule heat.

Thus, since the projection 13 formed on the end of the shank 12 is fitted in the recess 15 formed on the end of the tip 14, welding area of resistant welding increases and as well the tip 14 is reinforced by the steel projection 13 fitted in the recess 15, so that the tip 14 is advantageously prevented from breakage.

To facilitate welding work and to perform it completely, the diameter of the projection 13 is a little smaller than that of the recess 15 so as to provide a little clearance therebetween and the length of the projection 13 is a little longer than the depth of the recess 15, so that the top portion of the projection is caulked when the projection 13 is pressed into the recess 15. In this example, the shearing test showed that the shearing strength (rupture strength) of it was about 300 Kg, while in the case of a soldered spike which had the same engagement design above, the strength was about 220 Kg.

In the embodiment, the carbide tip had a larger diameter of $3.7^{\phi \pm 0.05}$ mm., a smaller diameter of $3.0^\phi$ mm., a height of $3.0^{\phi \pm 0.1}$ mm., and a depth of the recess of 1.2 mm., while the projection of the steel shank had a diameter of $1.2^{\phi} \pm 0.005$ mm. and a height of $1.6 \pm 0.05$ mm. respectively. The resistant welding was carried out under 700 A and a charge time of 25 sec. Heat-treatment was done as follows.

In this case shank material was plain carbon steel containing 10 percent of carbon.

After welding, it was carburized in an atmosphere of degenerated butane gas at 870° C. for three hours, and oil-quenched. Tempering was carried out at 200° C. for 1.5 hours.

Figure 1:
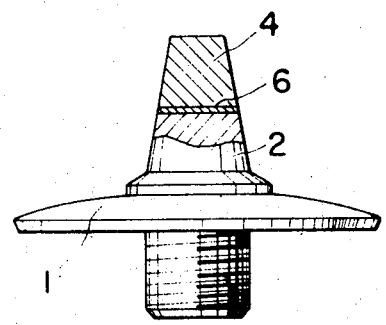
FIG. 1 is a side view, partly in section, of a conventional spike for shoes.
Figure 3:
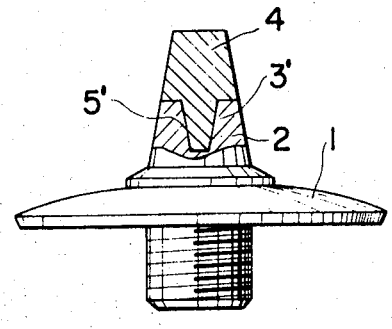
FIGS. 3 and 4 are side views, partly in section, of the other embodiments according to the present invention.
Figure 4:
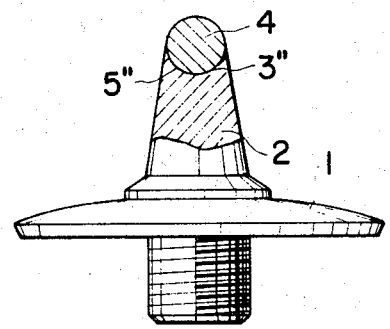

The contact engagement of FIG. 3 is contrary to the embodiment of FIG. 2, thus, a projection 3' is formed on an end of the tip 4' and complementary recess 5' is formed on an end of the shank 2', the former being received in the latter. As is shown in FIG. 4, the shape of the contact surface between the shank 2'' and the tip 4'' may be spherical, thus, a spherical recess 5'', and a spherical projection 3'' being fitted in the former.

Thus, in the present invention, snug fit contact surfaces of concave-convex are formed at the juncture of an end of the carbide tip and an end of the steel shank and are welded in a piece by electro-resistant welding. Therefore, both members are joined securely since the concave-convex surfaces increase welding area, so that there is no fear that the tip comes off the shank by violent movement of the spike during its usage. Still more, it is easy to arrange the relative positions of the steel shank and the tip, since the arranging of the members is done by merely inserting the projection of one member into the sink of the other. This enables performance of continuous welding of the contact surface. Thus, the lower part of the steel shank is embedded in a conveyor belt, and the recess or projection of the tip is fitted on the projection or recess 15 of the shank. Afterwards, an electric current is applied by roller electrodes. Of course, the resistant welding requires no solder or flux and is performed in shorter time. Heat-treating can also be done freely after the welding work.

Although explained, such that a steel shank has a flange, this flange may be attached to the shank after the super hard tip is secured to the shank. It is also apparent that the present method is of course applied to spikes having no flange, for example spikes for ball game shoes or running shoes. Thus, if the steel shank has a plate-like shape, for example in spikes for ball games shoes, etc., projections or recesses are formed on an end of the plate-like shank and recesses or projections are formed on an end of a post-like tip of super hard material. Both members are then secured by electro-resistant welding.

"Super hard tip" used in the present invention means an abrasion-resisting tip made of such material as having super high hardness, such as tungsten carbide and the other carbides.

What is claimed is:

1. A composite metal spike for shoes comprising a steel shank and a super hard tip, said steel shank being faced to the super hard tip through concave-convex contact interfitting surfaces which are joined into one piece by means of electro-resistant welding.

2. The spike for shoes of claim 1, wherein the concave-convex contact surfaces consist of a recess formed on the center of an end of the super hard tip with a projection of the steel shank being fitted in the recess.

3. The spike for shoes of claim 1, wherein the concave-convex contact surfaces consist of a recess formed on an end of the steel shank and a projection of the super hard tip being fitted in the recess.

4. The spike for shoes of claim 1, wherein the concave-convex contact surfaces consist of an inwardly curved part of the steel shank and an outwardly curved part of the super hard tip fitted in the inwardly curved part.

5. The spike for shoes of claim 1, wherein the steel shank is provided with a flange.

6. A method for manufacturing a spike for shoes, comprising:

shaping contact surfaces of a steel shank and a super hard tip into interfitting non-flat concave-convex shapes respectively, pressing a pair of electrodes to other parts of the steel shank and the super hard tip respectively after interfitting of said concave and convex shapes, and applying an electric current between the electrodes, whereby, the contact surfaces are fused locally by joule heat and joined securely into one piece.

* * * * *